(12) United States Patent
Niwa et al.

(10) Patent No.: US 6,607,820 B2
(45) Date of Patent: Aug. 19, 2003

(54) COMPOSITE SLIDING MATERIAL

(75) Inventors: Takahiro Niwa, Nagoya (JP); Eiji Kato, Nagoya (JP); Nobutaka Hiramatsu, Nagoya (JP); Takayuki Shibayama, Nagoya (JP)

(73) Assignee: Daido Metal Company Ltd., Nagoya (JP)

( * ) Notice: Subject to any disclaimer, the term of this patent is extended or adjusted under 35 U.S.C. 154(b) by 14 days.

(21) Appl. No.: 09/880,946

(22) Filed: Jun. 15, 2001

(65) Prior Publication Data

US 2002/0015839 A1 Feb. 7, 2002

(30) Foreign Application Priority Data

Jun. 15, 2000 (JP) .......................... 2000-179780

(51) Int. Cl.$^7$ .................. B32B 15/08; B32B 27/30; B32B 27/32; F02D 9/12
(52) U.S. Cl. .................. 428/323; 428/422; 428/457; 428/458; 428/473.5; 428/480; 123/188.9; 384/908; 384/909
(58) Field of Search .................. 123/188.1, 188.11, 123/188.9, 188.14; 384/908, 909, 910; 428/422, 480, 473.5, 323, 328, 329, 457, 458

(56) References Cited

U.S. PATENT DOCUMENTS 4,605,695 A * 8/1986 Sakamaki et al. .......... 428/327
4,703,076 A * 10/1987 Mori .......................... 524/404
5,364,682 A 11/1994 Tanaka et al. .............. 428/138
5,575,256 A * 11/1996 Peters et al. ................ 123/337

FOREIGN PATENT DOCUMENTS

| GB | 2 177 099 | 1/1987 |
| GB | 2 342 127 | 4/2000 |
| JP | 61266451 | 10/1987 |
| JP | 5339593 | 3/1996 |

* cited by examiner

Primary Examiner—Ramsey Zacharia
(74) Attorney, Agent, or Firm—Browdy and Neimark, P.L.L.C.

(57) ABSTRACT

Bush 4 is fabricated by providing porous sintered metal layer 7 of copper on the surface side of back metal layer 5 of steel plate through copper plating layer 6 and coating the inside and the surface of porous sintered metal layer 7 with sliding material 8 by impregnation. Sliding material 8 comprises 1–25 vol.% of tetrafluoroethylene-perfluoroalkylvinyl ether copolymer resin, 1–25 vol.% of at least one member selected from the group consisting of oxybenzoylpolyester resin and polyimide resin and 0.1–10 vol.% of hard particles having a Mohs hardness of 4 or more and average particle sizes of 5 $\mu$m or less such as $Al_2O_3$ and SiC, the balance being polytetrafluoroethylene resin (55 vol.% or more of the total siding material) as the main component. 0.5–25 vol.% of a solid lubricant such as graphite and $MoS_2$ can be further contained in total together with the hard particles. The sliding material containing polytetrafluoroethylene resin as the main component has an improved fretting wear resistance particularly when used as a bearing material.

21 Claims, 1 Drawing Sheet

COMPOSITE SLIDING MATERIAL

BACKGROUND OF THE INVENTION

The present invention relates to a composite sliding material containing a polytetrafluoroethylene resin as the main component, and particularly to a composite sliding material directed to improvement of fretting wear resistance when used as a bearing material.

Plain bearing materials for use without any lubrication include, for example, materials comprising a back metal layer and a sliding material layer comprising a synthetic resin as the main component provided on the surface side of the back metal layer. Such materials (sliding member compositions) are disclosed in JP-A-Sho 61 (1986)-266451 filed by the present applicants. The materials comprising a polytetrafluoroethylene resin (which will be hereinafter referred to as "PTFE") as the main component, other fluororesins, synthetic resins and a solid lubricant, have a low friction and a distinguished wear resistance.

Plain bearing comprising a synthetic resin (fluororesin) as a surface layer (sliding layer) is used as a bearing (bush) for supporting a throttle valve shaft in the engine throttle body, where the bush is exposed to fretting wear-susceptible situations of slight relative movements between two contact surfaces, different from the ordinary friction and wear. Said JP-A-Sho 61 (1986)-266451 takes no fretting wear into consideration and fails to teach any compositions of distinguished fretting wear resistance.

On the other hand, for example, JP-A-Hei 5 (1993)-339593 discloses a technique of improving the fretting wear resistance of plain bearing materials of PTFE series by adding an aromatic polyester resin and spherical carbon to PTFE. In the technique of JP-A-Hei 5 (1993)-339593 a satisfactory fretting wear resistance is however not always obtained because the hardness of spherical carbon is not enough and much spherical carbon falls out.

SUMMARY OF THE INVENTION

The present invention has been made in view of these situations and an object of the present invention is to provide a composite sliding material containing a polytetrafluoroethylene resin as the main component directed to improvement of fretting wear resistance when used as a bearing material.

Sliding materials of fluororesin (PTFE) series have a low friction and a low corrosion resistance (chemical resistance), and has such a merit that they can be used in a wide temperature range suitably without any lubrication, but the sliding materials of the conventional compositions have no satisfactory fretting wear resistance when exposed to fretting wear-susceptible situations. To enhance the fretting wear resistance, it is necessary to provide a composition capable of giving a tough and hard sliding material with a distinguished wear resistance against periodic repetitions of slight relative movements. As a result of extensive tests and studies to improve the fretting wear resistance of sliding materials of fluororesin (PTFE) series, the present inventors have successfully attained the present invention.

The present invention provides a composite sliding material, which comprises 1–25 vol.% of tetrafluoroethylene-perfluoroalkylvinyl ether copolymer resin (which will be hereinafter referred to as "PFA"), 1–25 vol.% of at least one member selected from the group consisting of oxybenzoylpolyester resin (which will be hereinafter referred to as "POB") and polyimide resin (which will be hereinafter referred to as "PI") and 0.1–10 vol.% of hard particles, the balance being PTFE as the main component (first mode of the present invention).

Figure 1:
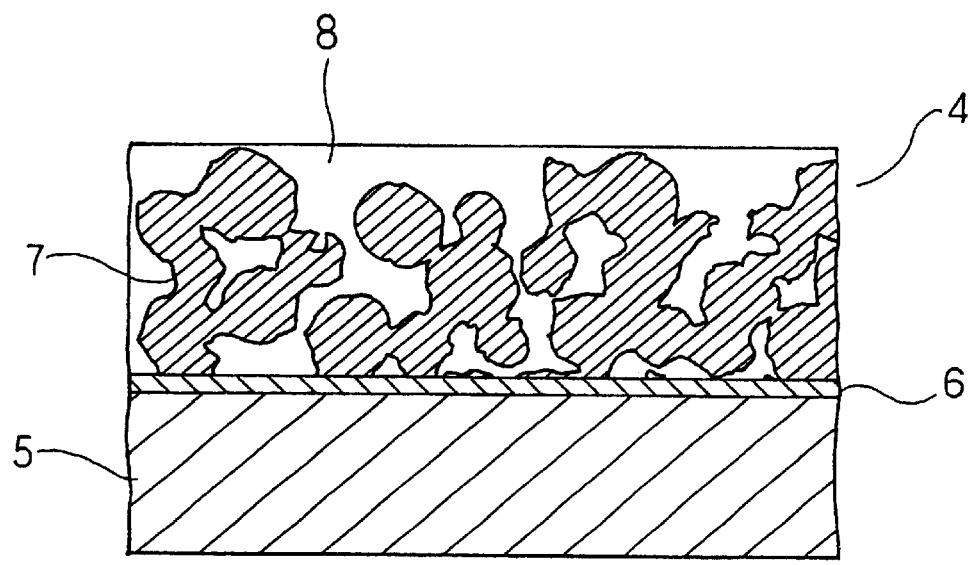
FIG. 1 is an enlarged longitudinal cross-sectional view schematically showing a bush structure according to one embodiment of the present invention.

In the drawings, reference numerals have the following meanings: 1: throttle body, 2: throttle valve, 3: shaft, 4: bush (plain bearing), 5: back metal layer, 7: porous sintered metal layer and 8: sliding material (bearing material).

DETAILED DESCRIPTION OF THE INVENTION

PFA undergoes mutual solution with PTFE to form a homogeneous material showing an action to elevate the hardness of a composition, as compared with single PTFE. Reasons for the selection of PFA are that PFA has a higher hardness than other fluororesins (e.g. tetrafluoroethylene-hexafluoropropylene copolymer resin, which will be hereinafter referred to as "FEP") have and furthermore it has a melting point near that of PTFE, showing a distinguished stability to the thermal decomposition.

For example, comparison of durometer hardness shows that PTFE has D55, whereas PFA has D60 and FEP has D55, and thus the hardness can be increased by mutual solution of PFA with PTFE.

On the other hand, PTFE has a melting point of 327° C. whereas PFA has a melting point of 300°–310° C. and FEP has a melting point of 250°–280° C. Thus, a resin mutually soluble with PTFE must be heated to 327° C. i.e. the melting point of PTFE, or higher. It seems that FEP having a lower melting point would undergo decomposition, etc. at 327° C. or higher, whereas PFA having a melting point near that of PTFE can undergo mutual solution with PTFE without any decomposition. It is necessary that a mixing proportion of PFA is 1–25 vol.%, preferably 5–20 vol.%. Below 1 vol.%, no hardness-enhancing effect can be obtained, whereas above 25 vol.% the friction characteristics will be lowered.

Organic powders consisting of at least one member selected from the group consisting of POB and PI (which will be hereinafter referred to as "POB/PI") have a higher hardness than PTFE has and are hard to decompose even at the melting point of PTFE or higher, showing an action to improve the fretting wear resistance upon dispersion of an appropriate amount thereof in the sliding layer. In that case, the wettability of PTFE toward POB/PI powders can be improved by combination with PFA, increasing the rigidity on the whole. It is necessary that a mixing proportion of POB/PI is 1–25 vol.%, preferably 5–20 vol.%. Below 1 vol.%, no fretting wear resistance-enhancing effect can be obtained, whereas above 25 vol.% the fretting wear resistance will be lowered by contrast.

Hard particles of higher hardness, when added thereto, can be distributed on the sliding surface, showing an action to enhance the fretting wear resistance and also showing an action to smooth the surface of a sliding counter member, thereby obtaining lower friction. In that case, the wettability of PTFE toward the hard particles can be improved by combination with PFA, thereby effectively preventing the hard particles from falling-out.

It is necessary that a mixing proportion of the hard particles is 0.1–10 vol.%, preferably 0.5–5 vol.%. Below 0.1 vol.% the fretting wear resistance-enhancing effect will be low, whereas above 10 vol.% the structure will become brittle and the fretting wear resistance will be lowered.

It is desirable that the present composite sliding material has a mixing proportion of PEFE of not less than 55 vol.% on the basis of total volume, in other words, a total mixing proportion of PFA+POB/PI +hard particles of not more than 45 vol.%. The present composite sliding material can be provided as a layer on the surface of a back metal layer, for example, by providing a porous metal layer on the surface of the back metal layer beforehand, mixing the present composite sliding material into a solvent, coating the porous metal layer by impregnation with the resulting mixture, followed by sintering at the melting point of PTFE or higher temperatures. In place of the porous metal layer, a back metal layer provided with an adhesive having an adhesiveness to the sliding layer, or a wire netting or expanded metal as a substitute for the back metal layer can be used.

In addition to the aforementioned composition, a solid lubricant can be added in a mixing proportion of 0.5–25 vol.% in total together with the hard particles (second mode of the present invention). The solid lubricant, when added thereto, can enhance a self-lubrication, thereby much lowering the friction and enhancing the wear resistance. In that case, graphite, $MoS_2$, etc. can be used as solid lubricants.

It is desirable to use hard particles having a Mohs hardness of 4 or higher and average particle sizes of not more than 5 $\mu$m (third mode of the present invention), preferably a Mohs hardness of 6 or higher and average particle sizes of not more than 1 $\mu$m. Specifically, ceramic hard particles such as $Al_2O_3$ having a Mohs hardness of 9, SiC having a Mohs hardness of 9 and $Fe_3O_4$ having a Mohs hardness of 6 can be used as hard particles.

The present composite sliding material can be used as a bearing material suitable for supporting a throttle valve shaft in the engine throttle body (fourth mode of the present invention). In that case, the bearing for supporting the throttle valve shaft is exposed to fretting wear-susceptible situations due to periodic repetitions of slight relative movements. The present composite sliding material can be very effectively used to improve the fretting wear resistance of bearing material in such situations.

Furthermore, the present composite sliding material, when used in combination with surface resin-coated shafts, can much more improve the fretting wear resistance (fifth mode of the present invention). A mixture of polyamide-imide resin (which will be hereinafter referred to as "PAI") with PTFE in a ratio of the former to the latter of 8:2 by weight, etc. can be used as the coating resin, and further addition of a solid lubricant thereto will be more effective.

DESCRIPTION OF PREFERRED EMBODIMENTS

An embodiment of the present invention as applied to the material of plain bearing (bush) for supporting a throttle valve shaft in the automobile engine throttle body will be described in detail below, referring to the drawings.

Figure 2:
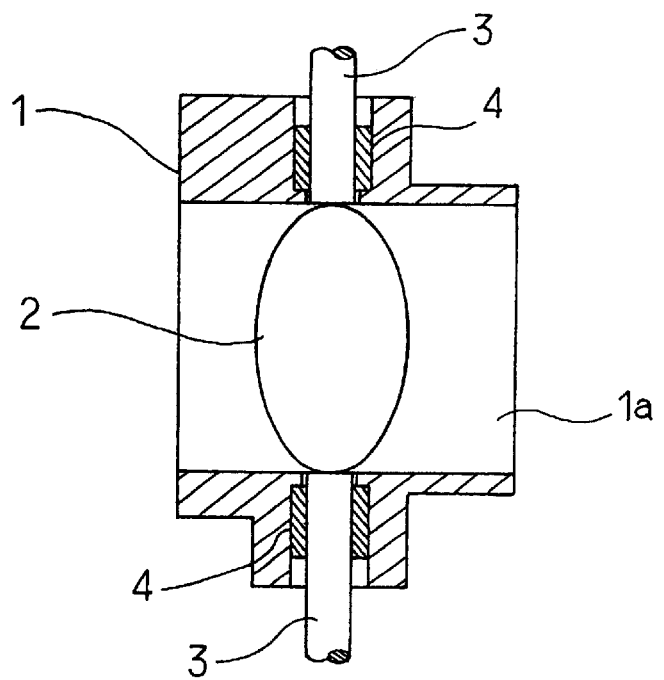
FIG. 2 is a longitudinal cross-sectional view showing a throttle body structure.

FIG. 2 schematically shows the essential structure of automobile engine throttle body 1, which has suction passage 1a in connection to an engine and throttle valve (butterfly valve) 2 provided in said suction passage 1a to adjust an opening degree of said suction passage 1a. Said throttle valve 2 has shafts 3 on its upper side and lower side, and said shafts 3 are rotatably supported by said throttle body 1 through cylindrical bushes 4, respectively. Said shafts 3 are to undergo rotating movement by an accelerator pedal.

In that case, said bushes 4 are to be used in an oil-free (dry) state without using any lubricating oil. Said shafts 3 are made of steel (S55C), and in the present embodiment their surfaces are resin coated (e.g. by a mixture of PAI with PTFE in a ratio of 8:2 by weight, further containing a solid lubricant) to a thickness of e.g. 20 $\mu$m.

FIG. 1 schematically shows the cross-sectional structure of said bush 4, which comprises, in the direction from the outer surface side forward the inner peripheral side of the bush, back metal layer 5 made from a steel plate of e.g. low carbon steel for general structural purposes; copper-plating layer 6 for improving a bonding strength provided on said back metal layer 5; porous sintered metal layer 7 made of copper alloy, provided on said copper plating layer 6; and sliding material (bearing material) 8 of the present embodiment, as will be described in detail below, provided within and on the surface of said porous sintered metal layer 7. In FIG. 1, no hatching is given to sliding material 8 for convenience's sake.

Said sliding material 8 is composed of PTFE and further contains components given in Examples 1 to 3 of the following Table 2, where $Al_2O_3$ or SiC having a Mohs hardness of 9 and average particle sizes of 1 $\mu$m is used as hard particles and also graphite ("Gr" in Table 2) or $MoS_2$ having average particle sizes of 10 $\mu$m is used as a solid lubricant.

Procedure of fabricating bush 4 will be briefly described below.

Copper alloy powder is sprayed onto a 0.8 mm thick steel plate (back metal layer 5) with copper plating layer 6 on the surface, to a thickness of 0.3 mm and heated at a temperature of 800°–860° C. in a reductive atmosphere to sinter the copper alloy powder. Porous sintered metal layer 7 is formed on back metal layer 5 (copper plating layer 6) thereby.

A liquid mixture of materials for sliding material 8 is prepared by adding predetermined amounts of PFA powder, POB/PI powder, hard particles and a particulate solid lubricant to a predetermined amount of PTFE dispersion, followed by uniform mixing. The mixture is applied to porous sintered metal layer 7 on said back metal layer 5 by impregnation, sintered at 380° C. and then rolled to a uniform thickness, whereby a flat material comprising back metal layer 5 and porous sintered metal layer 7 formed thereon, and being impregnated and coated with sliding material 8 can be obtained. Then, the resulting material is cut to a desired dimension and subjected to forming work (wrapping work) to fabricate cylindrical bush 4.

Then, bush 4 is inserted into throttle body 1 to support shaft 3 on its inner peripheral sliding surface (surface of sliding material 8).

To investigate the effectiveness of said sliding material 8, fretting wear tests were carried out on sliding materials having compositions as given in Examples 1–3 and Comparative Examples 1–5 of the following Table 2 under conditions given in the following Table 1, using two kinds of shafts, i.e. surface resin-coated shaft and surface resin-uncoated shaft, whose surface roughness, hardness, etc. are given in Table 1. Results of the fretting wear tests, i.e. fretting wear resistances in terms of changes in the inner diameter ($\mu$m) of bush 4, are shown in Table 2 together with sliding material compositions.

TABLE 1

| | Fretting test conditions |
|---|---|
| Bush size | 10 mm in inner diameter and 15 mm long |
| Counter shaft | Surface resin-uncoated shaft<br>Surface roughness (R max): 0.3 μm<br>Hardness (Hv): 500–600 (S55C)<br>Solid lubricant-containing resin-coated shaft<br>Coating resin of PAI/PTFE in a ratio of 80:20 by weight<br>Coated resin thickness: 20 μm |
| Acceleration | 50 G |
| Cycle per second | 200 Hz |
| Clearance | 50 μm |
| Lubrication | dry |
| Temperature | ambient temperature |
| Test duration | 100 hours |

TABLE 2

| | Composite sliding material composition (% by weight) | | | | | | | | Changes in bush inner diameter (μm) | |
|---|---|---|---|---|---|---|---|---|---|---|
| | PFA | FEP | POB | PI | Hard particles | Solid lubricant | Spherical carbon | PTFE | Against resin-coated shaft | Against resin-uncoated shaft |
| Example No. | | | | | | | | | | |
| 1 | 15 | | 20 | | $Al_2O_3$: 5.0 | | | balance | 25 | 41 |
| 2 | 15 | | 20 | | $Al_2O_3$: 5.0 | Gr: 2.5 | | " | 22 | 37 |
| 3 | 15 | | 10 | 10 | $Al_2O_3$: 7.5 | $MoS_2$: 5.0 | | " | 18 | 33 |
| Comp. Ex. No. | | | | | | | | | | |
| 1 | 10 | | | 20 | | | | " | 46 | 68 |
| 2 | | | 20 | | $Al_2O_3$: 5.0 | | | " | 45 | 71 |
| 3 | | 20 | 10 | | $Al_2O_3$: 2.5 | | | " | 51 | 75 |
| 4 | | | 30 | | | | 20 | " | 40 | 64 |
| 5 | 20 | | | | SiC: 2.5 | | | " | 43 | 60 |

It is evident from the results of fretting wear tests that changes in inner diameter of bush (fretting wear rate) are considerably small in all Examples 1–3 to show high fretting wear resistances, as compared with Comparative Examples 1–5, where the fretting wear rates are lower in case of using surface resin-coated counter shaft than in case of using surface resin-uncoated counter shaft, showing that it is more preferable to use the present composite sliding material as a bearing material for supporting a surface resin-coated shaft.

In all of Comparative Examples 2–4 using composite sliding materials containing no PFA or containing FEP in place of PFA, the fretting wear resistance is lower than those of Examples 1–3, because an appropriate amount of PFA has an action to enhance the rigidity and hardness of composite sliding materials upon mutual solution of PFA with PTFE.

In Comparative Example 5 using a composite sliding material containing neither POB nor PI, the fretting wear resistance is inferior to those of Examples 1–3, because dispersion of an appropriate amount of POB/PI having a higher hardness than that of PTFE on the sliding surface contributes to an improvement of rigidity on the whole, thereby increasing the fretting wear resistance. Wettability of PTFE forward POB/PI powder can be more improved by combination with PFA, whereas in Comparative Example 4 using a composite sliding material containing too much POB the fretting resistance is lowered.

In Comparative Example 1 using a composite sliding material containing no hard particles the fretting wear resistance is inferior to those of Examples 1–3 using composite sliding materials containing hard particles, because addition of an appropriate amount of hard particles contributes to dispersion of particles having a high hardness on the sliding surface, showing an action to improve the fretting wear resistance.

In Comparative Examples 2 and 3, a considerable amount of hard particles fall out, though not shown in Table 2, whereas in Examples 1–3, falling-out of hard particles is very few, because the wettability of hard particles toward PTFE is improved with combination with PFA, thereby effectively preventing the hard particles from falling-out.

Scrutinization of Examples 1–3 reveals that much better results are obtained in Examples 2 and 3 using composite sliding materials containing an appropriate amount of a solid lubricant than in Example 1 using a composite sliding material containing no solid lubricant, because addition of a solid lubricant enhances the self-lubrication, thereby much improving the wear resistance while keeping a low friction.

As fully described above, sliding material 8 of the present composition containing PTFE as the main component has a higher fretting wear resistance than the conventional sliding materials have and can be used suitably in fretting wear-susceptible situations such as bushes 4 for supporting shafts 3 of throttle valve 2 in throttle body 1.

In the foregoing embodiment, the present invention is applied to bushes 4 for supporting shafts 3 of throttle valve 2, but can be used in various sliding members for use in fretting wear-susceptible situations, where the present invention is not limited only to bushes (bearings), but is applied also to thrust washers, slide plates, etc. The present composite sliding material can be used not only in lubrication-free situations, but also in liquids such as lubricating oil, water, etc.

The present invention is not limited to the foregoing embodiment. For example, other hard ceramic particles such as $Cr_2O_3$ and $SiO_2$ or combinations of a plurality thereof can be used as hard particles, and also BN, WS$_2$, etc. can be used as a solid lubricant. Furthermore, materials for the back metal layer, porous metal layer, counter member (shaft), resin coating, etc. are not limited to those mentioned above. That is, the present invention can be modified or changed within the spirit and scope of the present invention.

What is claimed is:

1. A composite sliding material, which comprises a back metal layer and a sliding layer provided on the surface side of the back metal layer, the sliding layer consisting essentially of 1–25 vol.% of tetrafluoroethylene-perfluoroalkylvinyl ether copolymer resin, 1–25 vol.% of at least one member selected from the group consisting of oxybenzoylpolyester resin and polyimide resin and 0.1–10 vol.% of hard particles having a Mohs hardness of 4 or greater, the balance being polytetrafluoroethylene resin.

2. The composite sliding material of claim 1, wherein the sliding layer further contains 0.5–25 vol.% of a solid lubricant in total together with the hard particles.

3. The composite sliding material of claim 1, wherein the hard particles have average particle sizes of 5 μm or less.

4. The composite sliding material of claim 2, wherein the hard particles have average particle sizes of 5 μm or less.

5. The composite sliding material of claim 1 for use as a bearing material for supporting a throttle valve shaft in an engine throttle body.

6. The composite sliding material of claim 2 for use as a bearing material for supporting a throttle valve shaft in an engine throttle body.

7. The composite sliding material of claim 3 for use as a bearing material for supporting a throttle valve shaft in an engine throttle body.

8. The composite sliding material of claim 4 for use as a bearing material for supporting a throttle valve shaft in an engine throttle body.

9. The composite sliding material of claim 1, for use as a bearing material for supporting a surface resin-coated shaft.

10. The composite sliding material of claim 2 for use as a bearing material for supporting a surface resin-coated shaft.

11. The composite sliding material of claim 3 for use as a bearing material for supporting a surface resin-coated shaft.

12. The composite sliding material of claim 4 for use as a bearing material for supporting a surface resin-coated shaft.

13. The composite sliding material of claim 5, wherein the throttle valve shaft is a surface resin-coated shaft.

14. The composite sliding material of claim 6, wherein the throttle valve shaft is a surface resin-coated shaft.

15. The composite sliding material of claim 7, wherein the throttle valve shaft is a surface resin-coated shaft.

16. The composite sliding material of claim 8, wherein the throttle valve shaft is a surface resin-coated shaft.

17. A throttle valve bearing formed from a composite sliding material comprising a back metal layer and a sliding layer provided on the surface side of the back metal layer, the sliding layer consisting essentially of 1–25 vol.% of tetrafluoroethylene-perfluoroalkylvinyl ether copolymer resin, 1–25 vol.% of at least one member selected from the group consisting of oxybenzoylpolyester resin and polyimide resin and 0.1–10 vol.% of hard particles having a Mohs hardness of 4 or greater, the balance being polytetrafluoroethylene resin.

18. The throttle valve bearing of claim 17, wherein the sliding layer further contains 0.5–25 vol.% of a solid lubricant in total together with the hard particles.

19. The throttle valve bearing of claim 18, wherein the hard particles have average particle sizes of 5 μm or less.

20. The throttle valve bearing of claim 19 for use as a bearing for supporting a throttle valve shaft in an engine throttle body.

21. The throttle valve bearing of claim 20, wherein the throttle valve shaft is a surface resin-coated shaft.

* * * * *